United States Patent [19]
Poisner et al.

[11] Patent Number: 6,151,654
[45] Date of Patent: Nov. 21, 2000

[54] METHOD AND APPARATUS FOR ENCODED DMA ACKNOWLEDGES

[75] Inventors: David I. Poisner, Folsom; Joseph A. Bennett, Rancho Cordova; Andrew H. Gafken, Folsom, all of Calif.

[73] Assignee: Intel Corporation, Santa Clara, Calif.

[21] Appl. No.: 08/998,111

[22] Filed: Dec. 24, 1997

[51] Int. Cl.[7] .................................................. G06F 13/00
[52] U.S. Cl. ............................................. 710/240; 710/27
[58] Field of Search ..................................... 710/1, 22, 23, 710/36, 107, 240, 241, 110, 113, 27

[56] References Cited

U.S. PATENT DOCUMENTS

| | | | |
|---|---|---|---|
| 4,489,380 | 12/1984 | Carey et al. | 711/152 |
| 4,543,629 | 9/1985 | Carey et al. | 710/107 |
| 4,837,677 | 6/1989 | Burrus, Jr. et al. | 364/200 |
| 4,987,529 | 1/1991 | Craft et al. | 710/113 |
| 5,191,581 | 3/1993 | Woodbury et al. | 370/85.9 |
| 5,448,703 | 9/1995 | Amini et al. | 710/110 |
| 5,608,889 | 3/1997 | Werlinger et al. | 711/217 |
| 5,664,197 | 9/1997 | Kardach et al. | 710/240 |
| 5,896,550 | 4/1999 | Wehunt et al. | 710/22 |
| 5,944,807 | 8/1999 | Williams | 710/129 |

*Primary Examiner*—Glen A. Auve
*Attorney, Agent, or Firm*—Jeffrey S. Draeger

[57] ABSTRACT

A method and apparatus which may be used for direct memory access (DMA) acknowledges. A method of acknowledging a request for access to a bus from a bus agent access involves receiving a request for access to the bus and generating a request acknowledge signal. The request acknowledge is generated on a multiplexed bus in response to the request for access to the bus.

29 Claims, 6 Drawing Sheets

METHOD AND APPARATUS FOR ENCODED DMA ACKNOWLEDGES

BACKGROUND OF THE INVENTION

1. Field of the Invention

The present invention relates to computer bus protocols and more particularly to computer bus protocols for performing direct memory access (DMA) transactions.

2. Description of Related Art

Cost reductions of computer systems can often be realized by simplifying the interconnections between computer system components. Thus, signaling protocols which allow computer components to communicate using fewer dedicated signal lines can often reduce the expense of computer system manufacture. In fact, the allocation of component interconnects is often very closely controlled due to the high cost of each interconnect both at the component level and at the system level.

Improving performance, in contrast, often requires more signal lines to improve information throughput between devices. Thus, cost savings and performance improvements typically need to be balanced. Specific knowledge of signaling protocols or component functions may be used in some cases to allow computer system interconnections (e.g., component pins or other connectors and signal lines) to be used for multiple functions through the use of multiplexing.

One function found in many computer systems is direct memory access (DMA) data transfer. A DMA transfer allows blocks of information to be exchanged between a system device and a system memory without unnecessarily tying up the resources of the system processor. While the processor initiates DMA transfers, a DMA controller actually manages DMA transfers, allowing the processor to perform other tasks.

As shown in FIG. 1a, systems employing a common bus architecture such as the Industry Standard Architecture (ISA) and Extended Industry Standard Architecture (EISA) expansion bus structures typically have a series of DMA request (DREQ1–DREQn#) and DMA acknowledge (DACK1–DACKn#) signal lines connecting DMA agents to DMA controllers. A DMA agent is any bus agent which is capable of performing a DMA transaction. Such an agent may also be capable of performing other operations which do not involve DMA access, and which may in fact use entirely different protocols. A DMA controller typically includes logic to provide the DMA agent access to the system and may include logic to arbitrate between multiple DMA agents if such agents are present.

The DREQ and DACK signal lines are individually routed between DMA agents 110a–110n and a DMA controller 100. The DMA controller 100 is typically coupled through a host bus 115 to a bus bridge 120, a memory 130, and a processor 125. Many such systems accommodate up to seven DMA agents, requiring up to seven pairs of request and acknowledge signal lines.

While minimizing the interconnections between computer components reduces costs, simplified connectivity may also be useful in other ways. For example, having fewer signal lines can lead to reduced signal propagation delays if signal line layout can be improved. Additionally, simpler connectors may improve durability or ease of connection where certain components or subsystems are not permanently affixed, but rather may be frequently or infrequently detached or disconnected.

One common example is a docking station which allows a mobile computing device to mate with a more stationary computing device. The stationary device may include additional or larger peripheral devices such as a disk drive, a network connection, keyboard, mouse, monitor, or other devices which may be inconvenient to routinely transport. Typically, such a docking arrangement includes a set of connectors on a surface of the mobile computing device (e.g., the back of a laptop computer) which interfaces with a mating set of connectors in the receiving device.

In order to reduce the number of connectors necessary to conduct DMA accesses through a computer host bus such as the Peripheral Component Interconnect (PCI) bus, DMA request and acknowledge signals have been serially encoded using the PCI bus request (REQ#) and grant (GNT#) signal. Such an arrangement allows a DMA request on a secondary bus to be transmitted over the PCI bus using the standard REQ# and GNT# signal lines. Additionally, this technique allows a DMA controller located in a separate computing device to obtain bus access from the central system I/O controller using PCI request and grant signals.

One such prior art system is illustrated in FIG. 1b. This system includes a DMA channel number encoder/decoder 105 coupled through a host bus 115 to a bus bridge 120, a memory 130, and a processor 125. The DMA channel number encoder/decoder 105 handles DMA requests signaled by DMA agents 110a–110n to the DMA controller 100 using DREQ1#–DREQn# signals and acknowledged by the controller using DACK1#–DACKn# signals. The DMA channel number encoder/decoder 105, however, does not directly place these DMA transactions on the host bus 115, but rather conveys the requests by serially signaling the DMA channel number or numbers to a system I/O controller 150 using a REQ# signal line 162. The system I/O controller 150 includes a DMA controller 100 which performs arbitration between the various DMA agents requesting access to the host bus 115.

A second DMA controller 160 may signal DMA requests to the system I/O controller 150 in a similar fashion. This second DMA controller 160 may be located in a portable computing device and coupled to the host bus 115 via a bus bridge or other connector. Such an arrangement allows DMA requests to be conveyed from the N DMA agents 170a–170n in a separate device to the system I/O controller 150 using the REQ# and GNT# lines of the DMA controller 160. Further details of related systems are described in U.S. patent application Ser. No. 08/426,818 entitled "Direct Memory Access Transfer Protocol," and U.S. patent application Ser. No. 08/426,825 entitled "A Method and Apparatus for Handling Bus Master Channel and Direct Memory Access (DMA) channel Access Requests at an I/O Controller."

While this approach channels a number of DMA requests from separate DMA agents through a single request/grant pair, such systems do not alter or optimize the expansion bus DMA signaling protocol. Instead, such systems continue using dedicated request/acknowledge and request/grant signal line pairs to convey DMA requests on the expansion bus.

One additional prior art DMA signaling protocol utilizes two address lines to signal information regarding a particular DMA transfer. In such a system, two address lines (e.g., AO and Al) indicate which byte(s) of the data bus are used to transfer data. This prior art system does not, however, eliminate or reduce the overhead of transmitting request and acknowledge signals for DMA transfers.

Thus, while DMA signaling protocols have evolved, prior art approaches still require an unnecessarily large number of signal lines to effectuate DMA transfers. Any reduction in the number of signal lines required may generally reduce the cost of computer systems and may also ease connection and reduce physical wear for computer components which may be connected to or either internally or externally disconnected from a computer system.

SUMMARY

A method and apparatus which may be used for direct memory access (DMA) acknowledges is described. A method of acknowledging a request for access to a bus from a bus agent access involves receiving a request for access to the bus and generating a request acknowledge signal. The request acknowledge is generated on a multiplexed bus in response to the request for access to the bus.

BRIEF DESCRIPTION OF THE FIGURES

The present invention is illustrated by way of example and not limitation in the figures of the accompanying drawings.

DETAILED DESCRIPTION

The present invention provides a method and apparatus for generating encoded or multiplexed acknowledge signals which may be used in a DMA signaling environment. In the following description, numerous specific details such as signal names, signal polarities, bus widths, and logic partitioning and integration choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included functional descriptions, will be able to implement the necessary logic circuits without undue experimentation.

According to the present invention, acknowledge signals may be encoded and/or multiplexed in a manner which reduces the number of system interconnections. In some embodiments, the acknowledge transmission techniques may simplify computer system design and manufacture. Attendant to such interconnect simplifications, manufacturing costs may be reduced, signal propagation delays may be reduced, and the ease of use and longevity of component connectors may be enhanced.

Figure 1A:
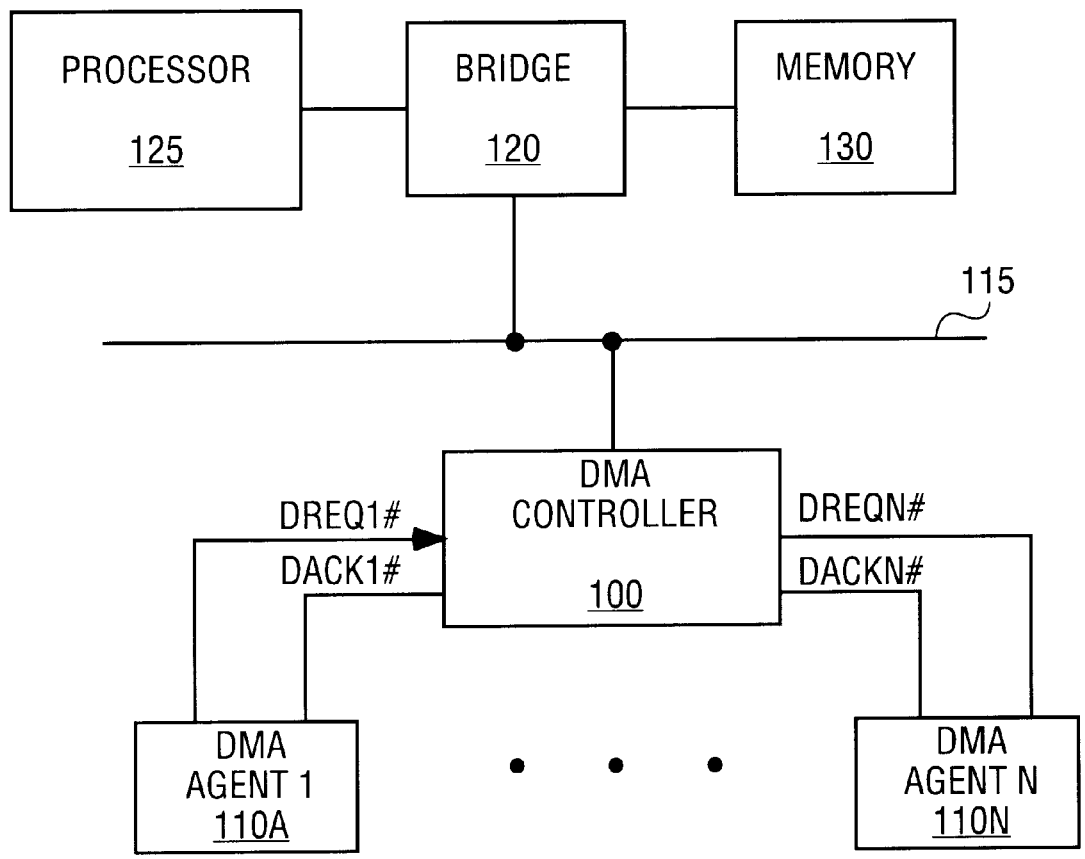
FIGS. 1a and 1b illustrate prior art systems utilizing DMA controllers which control access to a host bus.
Figure 1B:
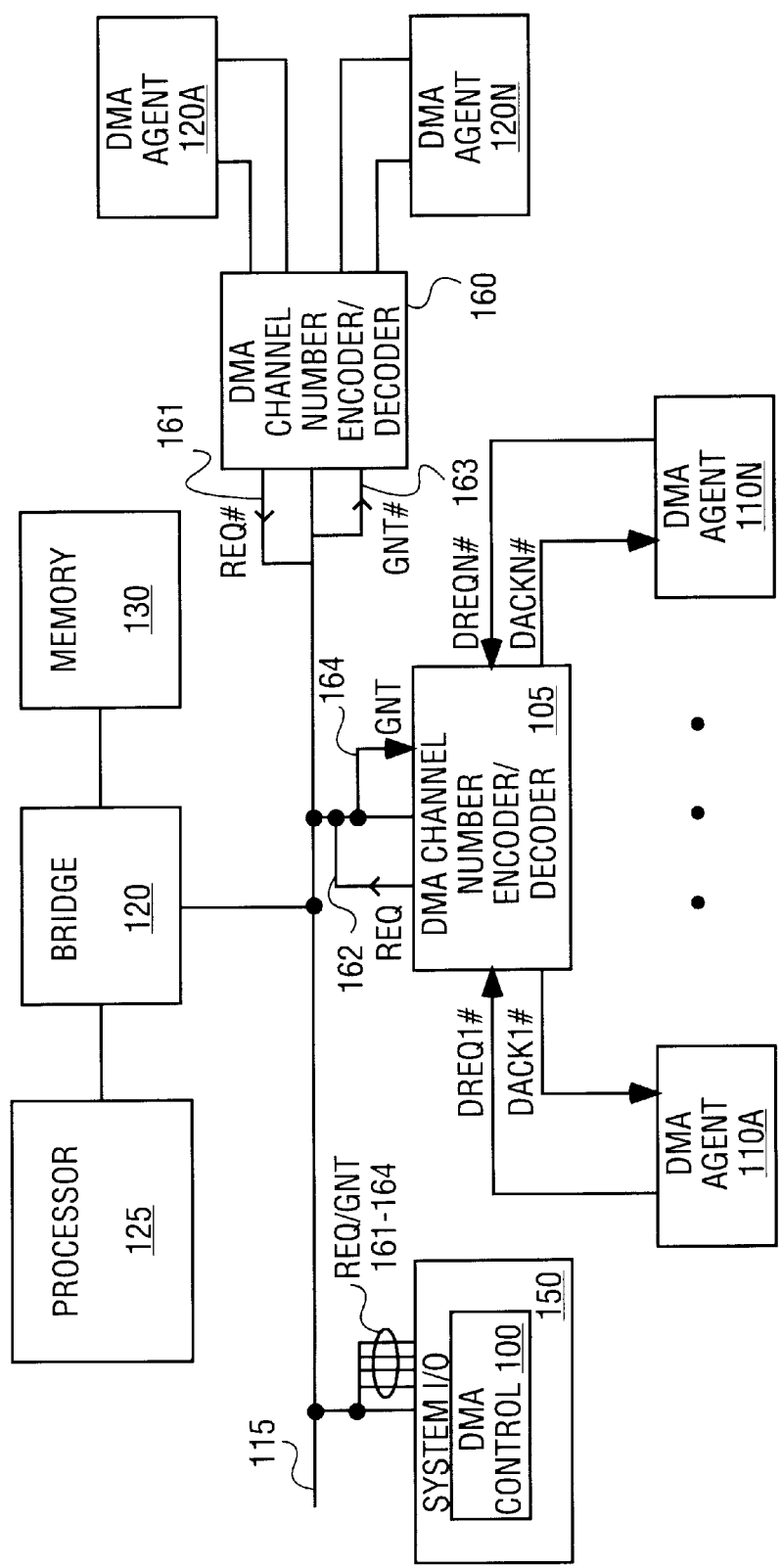
Figure 2:
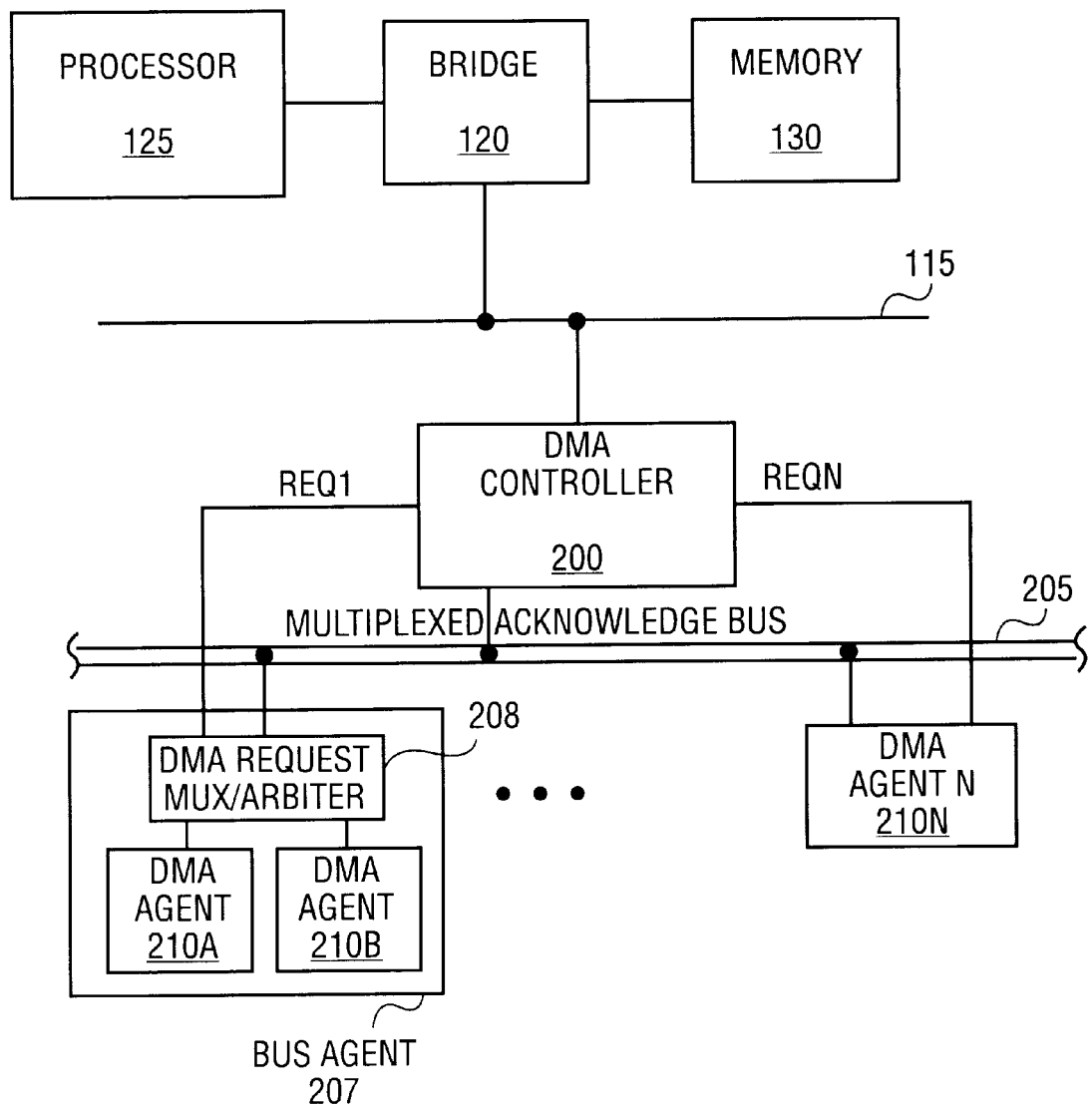
FIG. 2 illustrates one embodiment of a system of the present invention.

FIG. 2 illustrates one embodiment of a system of the present invention. Like prior art systems, this system includes a processor 125 and a memory 130 which communicate through a bridge 120 with a host bus 115. Many other possible system arrangements are possible and within the scope of the present invention. For example, portions or all of the processor 125, the bridge 120, and the memory 130 may be integrated into single components or split into multiple components. Components may also be separated through different bus structures or even divided across networking resources. Any system which requires a controller, such as DMA controller 200, to arbitrate between multiple agents, such as DMA agents 210a–210n, may be used.

As illustrated, the DMA controller 200 is coupled to the host bus 115, typically so that DMA transfer information can be programmed into the DMA controller 200 by a program (stored in the memory 130) being executed by the processor 125. Such DMA transfers are well known in the art, and the techniques of the present invention can be applied to any DMA system where the DMA agents signal the DMA controller and await an acknowledge specifically directed to the requesting agent.

One embodiment of the invented arrangement involves the use of a multiplexed acknowledge bus 205 which is coupled to the DMA controller 200 and the DMA agents 210a–210n. A multiplexed bus is one which transmits different signals, rather than just different values of the same signals, at different points in time. In other words, the bus may be transmitting, for example, data in one cycle and addresses or commands in other cycles. Additionally, different portions of a multiple-bit address, command, or data driven on the same signal lines of a bus at different times are "multiplexed." The multiplexed acknowledge bus 205 allows the controller not only to simultaneously send an encoded acknowledge signal to all of the agents 210a–210n, but also to send other signals at other times.

As illustrated, the embodiment of FIG. 2 utilizes separate request signals (REQ1–REQn) to signal requests from the individual bus agents. Bus agents such as bus agent 207 may use circuitry such as a DMA request multiplexer/arbiter 208 to signal requests for multiple DMA channels from DMA agents 210a and 210b via a single DMA request line REQ1#. Alternative techniques could also be used to signal requests, especially techniques such as further multiplexing which may further reduce pin counts. In response to the bus agent requests, the DMA controller 200 drives an acknowledge cycle on the multiplexed bus 205 to all the bus agents on that bus. The acknowledge cycle signals the channel number of a DMA request, and thereby grants access to the DMA agent making that DMA request.

Figure 3:
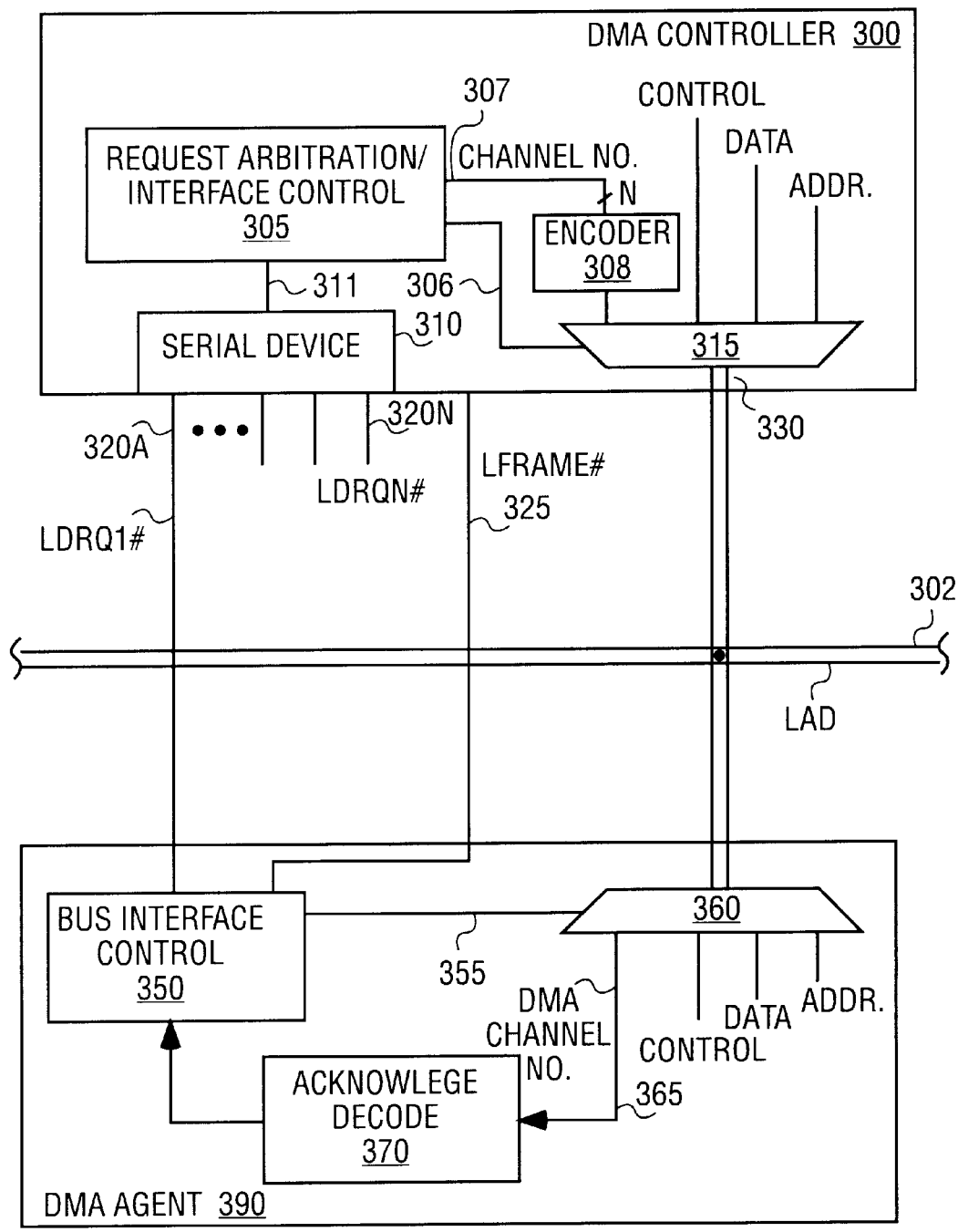
FIG. 3 illustrates details of one embodiment of a bus controller and a bus agent of the present invention.

FIG. 3 illustrates details of one embodiment of a DMA controller 300 and a DMA agent 390 of the present invention. These components could be used respectively for the DMA controller 200 and any or all of the DMA agents 210a–210n illustrated in FIG. 2. The arrangement of FIG. 3 utilizes a multiplexed control, data, and address bus, LAD bus 302 to which both the DMA controller 300 and the DMA agent 390 are coupled. A request signal (LDRQ1#) on signal line 320a and a bus cycle framing signal (LFRAME#) on signal line 325 couple the DMA controller 300 to the DMA agent 390. Additionally, the DMA controller 300 is adapted to receive a number of DMA request signals LDRQ1#–LDRQn# on signal lines 320a–320n if other DMA agents are present in the system. Although not shown in FIG. 3, a clock signal (LCLK) is also provided to both the DMA controller 300 and DMA agents such as agent 390.

In embodiments where the DMA controller 300 and DMA agent 390 are discrete components, this arrangement results in a very low pin count arrangement (i.e., few external interconnections) between the DMA agent 390 and the DMA controller 300, resulting in the attendant advantages from having fewer component and system interconnections. In one embodiment, the LAD bus is a four bit bus which serially conveys data, address, and control signals (such as acknowledge signals).

To facilitate the communication over the multiplexed bus 302, the DMA controller 300 includes a multiplexer 315 which multiplexes control, data, and address signals onto a controller output bus 330. The multiplexer 315 is controlled using at least one signal line 306 from request arbitration and interface control logic 305. The request arbitration and interface control logic 305 also provides a channel number to an encoder 308 which passes the encoded channel number to the multiplexer 315 via signal line(s) 307; however, the channel number may also be considered part of the "control" information fed into the multiplexer.

The encoder 308 may encode the channel number in any manner convenient for transmission on the LAD bus 302. For example, up to eight DMA channel numbers could be encoded by transmitting the binary number of the channel number on three LAD bus 302 bits. The encoder 308 may be unnecessary if the request arbitration and interface control circuit 305 outputs the channel number in a format which may be driven to the LAD bus 302. Thus, 'encoding' only suggests a representation of the channel number which does not use individual signal lines dedicated to each DMA agent, but rather utilizes acknowledge signals transmitted on a plurality of signal lines which can convey DMA channel numbers to multiple DMA agents.

Figure 4:
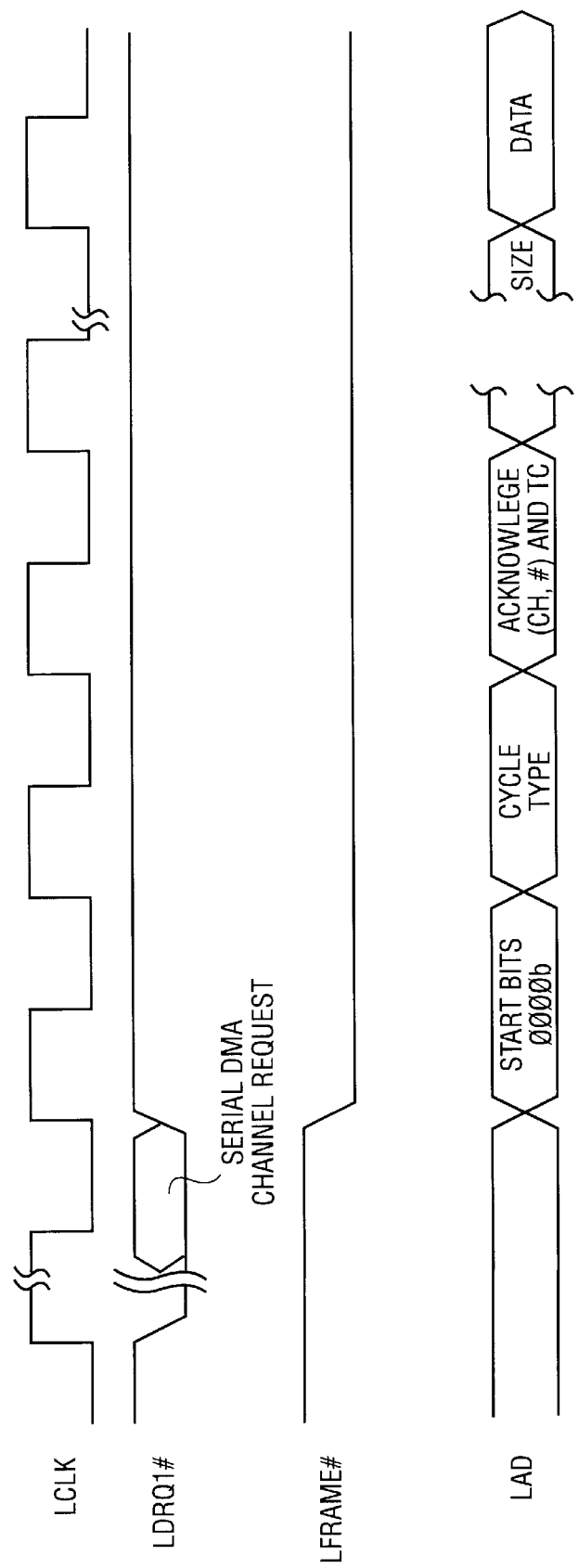
FIG. 4 is a timing diagram illustrating signals for requesting and granting bus access according to one embodiment of the present invention.

A timing diagram of the request/acknowledge signaling of one embodiment of the DMA controller 300 is illustrated in FIG. 4. The DMA controller 300 receives one or more DMA request signals on the signal lines 320a–320n (LDRQ1#–LDRQn#). As indicated by the waveforms of FIG. 4, bus interface control logic 350 of the DMA agent 390 drives the LDRQ1# signal low (as a start bit) and then drives a serial DMA channel request which takes several cycles of the LCLK signal.

A serial decoder 310 in the DMA controller 300 decodes a specific DMA channel number which is encoded in the request. This allows each DMA agent to control multiple or varying DMA channel numbers. The channel numbers of the DMA requests are passed from the serial decoder 310 via a bus 311 to the request arbitration and interface control logic 305 where any convenient request arbitration technique may be used. Often such DMA controllers offer multiple possible arbitration algorithms which may be selected by the user. Ultimately, however, the request arbitration and interface control circuit 305 selects one of the DMA channels which is granted access to a bus from which the memory may be accessed (e.g., the host bus 115 of FIG. 2).

After arbitration by the request arbitration and interface control logic 305 (which may take numerous cycles due to pending DMA requests and/or other requests to access the memory), the DMA controller 300 begins a cycle by asserting the LFRAME# signal on the signal line 325. Following the assertion of the LFRAME# signal, the LAD bus 302 is driven with start bits as signaled in one embodiment by putting the value 0000 binary on the four bits of the LAD bus 302. Next, cycle type information is provided on the LAD bus 302, indicating whether an I/O or memory read or write is to occur, or similar information. As the DMA agent 390 has received the LFRAME# signal and start bits, the bus interface control logic 350 can properly control, using signal line 355, a demultiplexer 360 to route the incoming information.

Notably, the function of the demultiplexer 360 may be implemented in a distributed fashion by enabling certain logic functions affiliated with the LAD bus when the proper signals arrive on that bus. For example, when the acknowledge cycle is generated (as shown after the cycle type information in FIG. 4), the DMA channel number bits sent via the LAD bus 302 are transferred via signal line(s) 365 to an acknowledge decode circuit 370. This function may be achieved either via a demultiplexing function or equivalently by enabling either the acknowledge decode circuit 370 or enabling the assertion of an output of that circuit. A terminal count (TC) bit may also be transmitted in the same cycle as the DMA channel number (e.g., three bits may be dedicated to signaling the channel, and a fourth may be the TC bit).

In one embodiment, the DMA channel number is simply transmitted in binary form over the bits of the LAD bus 302, and the acknowledge decode circuit 370 routes signals representing the DMA channel number to the bus interface control logic 350 so that the bus interface control logic 350 can determine if the acknowledge is responsive to a request from that DMA agent (by comparing the channel number received to the channel numbers of outstanding request(s) for that DMA agent) and can appropriately perform the DMA transfer. This type of "encoding" simply involves placing the binary value of the channel number on the multiplexed bus.

Alternatively, the channel number or other bus agent identifying information could be encoded using any other encoding suitable for transmission on the bus chosen. Additionally, the acknowledgment cycle may extend for one or more clock cycles depending on the number of possible requesting agents or DMA channels, the type and amount of any other information included with the acknowledge, and the width of the LAD bus.

In this embodiment, using at least one clock cycle of the DMA transfer to multiplex the acknowledgment cycle on the LAD bus 302 reduces the number of interconnects necessary between the DMA controller and the DMA agent. The price of the decreased number of interconnects may be the increased latency caused by any extra bus cycle(s) required; however, the latency change may be small with respect to the total DMA transfer. Additionally, the reduction in pins may justify the latency regardless of whether it is relatively small. Alternative embodiments (in contrast to the LAD bus 302 which transfers address, control, and data) may use a separate address bus, a data bus, a control bus, or any other combination thereof, as the bus onto which the acknowledge signal is multiplexed. Additionally, alternate embodiments may multiplex the DMA acknowledge on signal lines which are not in use during that cycle if such signal lines are available, obviating the need to insert an extra cycle.

As further illustrated by the waveforms of FIG. 4, after the acknowledgment cycle is completed, a number of cycles on the LAD bus 302 may be dedicated to other DMA information such as transfer size (SIZE). Once all of the necessary information about transfer has been communicated between the DMA controller 300 and the DMA agent 390, data is transferred over the LAD bus 302. When the data transfer is complete, the DMA controller deasserts the FRAME# signal (not shown).

It is not crucial to all embodiments of the present invention that the foregoing sequence of cycles be included in the acknowledgment process. In fact, much of the information conveyed over the multiplexed bus could be transferred in a different manner or through different signal lines. The discussed embodiment does, however, provide an arrangement for multiplexing information such as cycle type, terminal count, and transfer size at least some of which is used in most DMA transactions. Thus, this embodiment provides a mechanism for conveying acknowledge signals as well as other DMA transfer characteristics.

Figure 5:
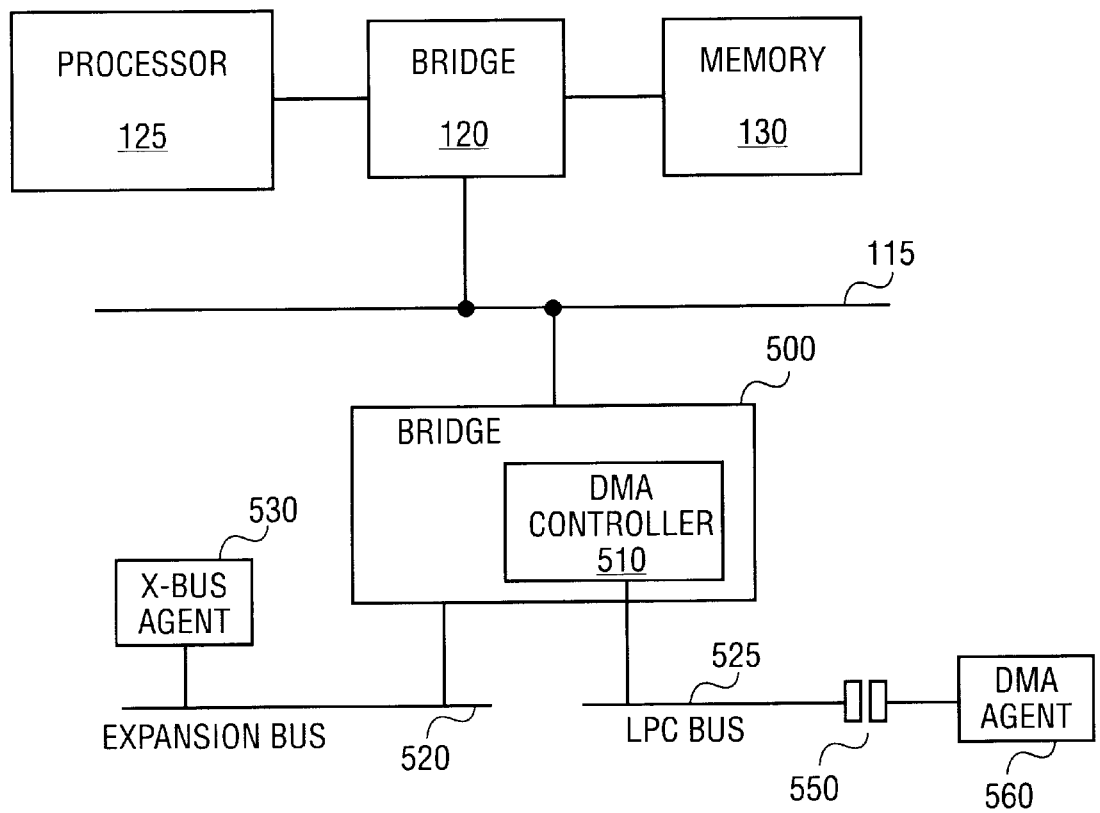
FIG. 5 illustrates an alternate embodiment of a computer system according to the present invention.

An alternate embodiment of a computer system utilizing the present invention is illustrated in FIG. 5. This system includes the processor 125, memory 130, bridge 120, and host bus 115 as discussed previously with respect to FIG. 2. Additionally, FIG. 5 illustrates that a DMA controller 510 can be integrated into a bus bridge 500 which interfaces through a low pin count (LPC) bus 525 to one or more DMA agents such as the illustrated DMA agent 560. The LPC bus 525 may communicate multiplexed DMA acknowledge cycles as previously discussed throughout this disclosure.

Additionally, the DMA agent 560 may be connected to the LPC bus by a connector 550. The connector 550 may be a connector whereby the DMA agent 560 is removably connected to the LPC bus such that the DMA agent may be repeatedly inserted and removed from the computer system, or it may be a connector where the device is typically installed once and perhaps removed when an optional upgrade is performed. In either case, the simplified connector 550 resulting from the lower pin count may be less expensive and/or more durable due to the reduced mechanical interface.

In some embodiments, all expansion bus agents may be located on the LPC bus, but, as illustrated, an additional expansion bus 520 may be included. Thus, additional devices with traditional expansion bus interfaces (i.e., X-Bus agent 530) may also be coupled to the bridge 500. Maintaining a standard expansion bus interface may allow the use of less expensive legacy expansion bus products which have not been migrated to the LPC bus to continue to be used in the computer system.

Thus, the method and apparatus of the present invention provides encoded and/or multiplexed acknowledge signals which may be used for a DMA transfer. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A method comprising:
   receiving a request for access to a bus from a bus agent on a request line; and
   generating a request acknowledge signal in response to the request for access to the bus on a plurality of multiplexed signal lines of a multiplexed bus that are coupled to a plurality of bus agents to provide acknowledge signals to said plurality of bus agents.

2. The method of claim 1 wherein the bus for which access is requested is the multiplexed bus on which the request acknowledge signal is generated.

3. The method of claim 2 wherein said multiplexed bus is multiplexed to transmit address, data, and control information including said request acknowledge signal on all of said plurality of multiplexed signal lines.

4. The method of claim 1 wherein the bus agent is a DMA bus agent, the request is a DMA request, and generating the request acknowledge signal further comprises generating a DMA channel number on the multiplexed bus.

5. The method of claim 1 wherein generating the request acknowledge signal further comprises transmitting a DMA acknowledge signal over the plurality of multiplexed signal lines, all of the plurality of multiplexed signal lines also being used to transmit address, command, and data information for a DMA transfer involving the bus agent.

6. The method of claim 5, further comprising all of the plurality of bus agents decoding a DMA channel number from the DMA acknowledge signal, and one of the plurality of bus agents recognizing when the DMA channel number indicates that bus agent.

7. The method of claim 5 wherein receiving further comprises receiving a serially encoded DMA transfer request signal on the request line.

8. The method of claim 7 wherein receiving further comprises decoding the serially encoded DMA request signal from the request line which indicates a DMA channel.

9. The method of claim 1 wherein generating a request acknowledge signal further comprises:
   inserting a request acknowledge cycle; and
   driving the request acknowledge signal during the request acknowledge cycle.

10. The method of claim 1 wherein the multiplexed bus is a low pin-count bus.

11. The method of claim 1 wherein the multiplexed bus is a four bit bus.

12. The method of claim 1 wherein generating the request acknowledge signal further comprises multiplexing a DMA acknowledge signal onto a command bus.

13. A method comprising:
   generating a request on a request line for a bus agent to access a bus;
   receiving a request acknowledge signal on a plurality of multiplexed signal lines of a multiplexed bus, the plurality of multiplexed signal lines being coupled to a plurality of bus agents to provide acknowledge signals to said plurality of bus agents; and
   determining if the request acknowledge signal is responsive to the request.

14. The method of claim 13 wherein the request acknowledge signal includes a DMA channel number.

15. The method of claim 14 wherein determining further comprises:
   decoding the DMA channel number from a multiplexed address, data, and command bus; and
   comparing the DMA channel number which is received from the multiplexed bus to at least one requested channel number.

16. The method of claim 13 wherein receiving the request acknowledge signal further comprises:
   receiving the request acknowledge signal during a separate request acknowledge cycle on the multiplexed bus.

17. A controller circuit comprising:
   request logic coupled to receive a request from a bus agent on a request line and coupled to generate an acknowledge signal in response to the request; and
   multiplexing logic coupled to multiplex at least one of data signals and address signals with the acknowledge signal onto a plurality of multiplexed signal lines of a controller circuit output bus.

18. The controller circuit of claim 17 wherein the controller circuit is a DMA controller circuit, the request is a DMA request, the bus agent is a DMA agent, and wherein the acknowledge signal is a DMA acknowledge.

19. The controller circuit of claim 18 wherein the controller circuit output bus is a multiplexed address, data, and command bus.

20. The controller circuit of claim 17 wherein the request logic is coupled to generate the acknowledge signal during an acknowledge cycle on the controller circuit output bus.

21. A bus agent comprising:
a bus interface control circuit coupled to generate a bus access request on a request line; and
an acknowledge decode circuit coupled to receive a plurality of signals from a multiplexed bus having multiplexed signal lines that transmit acknowledge signals and at least one of address and data signals, and to detect when the bus access request generated by the bus interface control circuit has been acknowledged via the multiplexed bus.

22. The bus agent of claim 21 wherein the bus agent is a DMA agent, the bus access request includes a requested DMA channel number, the plurality of signals include a granted DMA channel number, and wherein the multiplexed bus comprises a multiplexed address, data, and command bus.

23. The bus agent of claim 21 wherein the acknowledge decode circuit is coupled to decode a transmitted DMA channel number transmitted over the multiplexed bus and to compare the transmitted DMA channel number to a requested DMA channel number requested by the bus interface control circuit.

24. A computer system comprising:
a memory containing a program including a request that a data transfer be performed;
a controller coupled to the memory via a first bus and coupled to a multiplexed bus, the multiplexed bus having a plurality of multiplexed signal lines to multiplex data, address, and control signals including acknowledge signals;
a processor which is coupled to the memory and the controller and which executes the program thereby programming the controller to perform the data transfer; and
a bus agent which requests commencement of the data transfer by the controller on a request line and decodes an acknowledge signal generated by the controller on the plurality of multiplexed signal lines.

25. The computer system of claim 24 further comprising a plurality of bus agents coupled to the multiplexed bus, wherein each bus agent is coupled to decode an acknowledge signal generated by the controller on the multiplexed bus and to recognize when the acknowledge signal indicates that bus agent.

26. The computer system of claim 24 wherein the bus agent is a DMA agent, the data transfer is a DMA transfer, and the acknowledge signal is a DMA acknowledge signal.

27. A method comprising:
receiving a DMA request from one of a plurality of DMA agents on a dedicated DMA request line for that one of the plurality of DMA agents; and
generating an encoded DMA acknowledge cycle on a plurality of signal lines coupled to each of the plurality of DMA agents.

28. A computer system comprising:
a memory;
a processor coupled to the memory;
a bus including a plurality of DMA acknowledge signal lines and a DMA plurality of DMA request lines;
a plurality of DMA agents coupled to the plurality of DMA acknowledge signal lines, each DMA agent being capable of generating at least one of a plurality of DMA request signals on one of the plurality of DMA request lines dedicated to that DMA agent; and
a controller coupled to the memory and the processor, the controller being coupled to receive the plurality of DMA request signals from the plurality of DMA agents, the controller also being coupled to generate an encoded DMA acknowledge signal on all of the plurality of DMA acknowledge signal lines.

29. The computer system of claim 28 wherein the plurality of DMA acknowledge signal lines comprise multiplexed address, data, and control lines, all of said plurality of DMA acknowledge signal lines being used for address, data, and control information at different times.

* * * * *